United States Patent [19]

Brockman

[11] 4,374,473
[45] Feb. 22, 1983

[54] CABLE TESTING SYSTEM

[76] Inventor: Thomas H. Brockman, 622 Ponce DeLeon, Pass Christian, Miss. 39571

[21] Appl. No.: 254,697

[22] Filed: Apr. 16, 1981

[51] Int. Cl.³ .......................... G01L 5/06; B66C 1/12
[52] U.S. Cl. .................................... 73/158; 254/391; 294/78 R
[58] Field of Search .................... 73/158, 862.56, 826; 294/78 R; 254/391

[56] References Cited

U.S. PATENT DOCUMENTS 2,890,905 6/1959 Peters ................................. 294/78 R
2,925,299 2/1960 Koons et al. ..................... 294/78 R Primary Examiner—Howard A. Birmiel
Attorney, Agent, or Firm—R. S. Sciascia; F. I. Gray

[57] ABSTRACT

A cable testing system which eliminates the swivel on the crane hook. Means are provided for attaching a crane weight indicator system (dial scale) to a crane lifting block directly. Steel bars are inserted through the block on the lifting pin and four short slings are attached to these bars. The weight indicator is then hung by these slings, with the cable to be tested connected from the weight indicator to a dead man in the ground.

3 Claims, 3 Drawing Figures

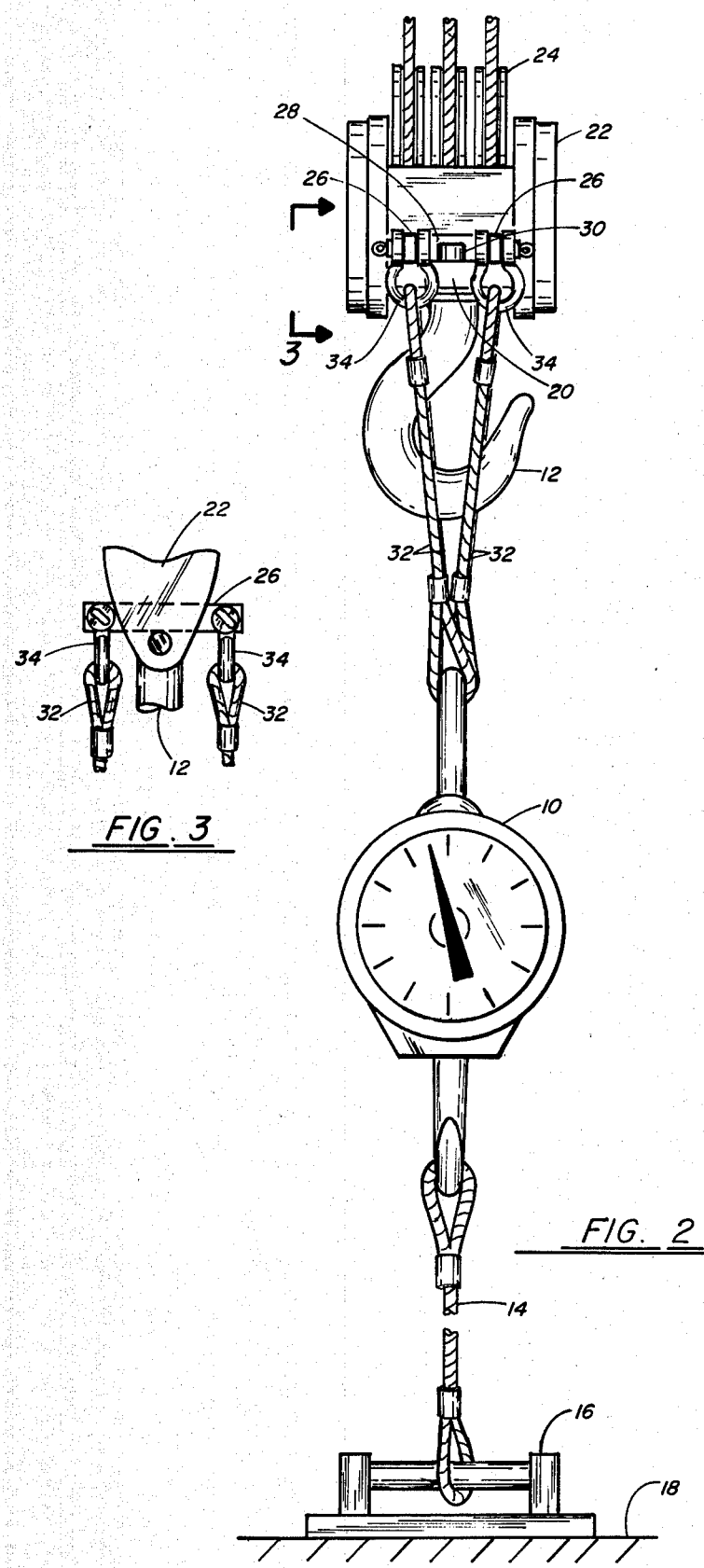

CABLE TESTING SYSTEM

The invention described herein may be manufactured and used by or for the Government of the United States of America for governmental purposes without the payment of any royalties thereon or therefor.

BACKGROUND OF THE INVENTION

1. Field of the Invention

The present invention relates to cable testing systems, and more particularly to a cable testing system which tests the safe working load of a cable without untwisting the lay.

2. Description of the Prior Art

Cables after being manufactured are required to be tested according to OSHA regulations. To test cables after manufacture a weight indicator system is hung on a crane hook of adequate capacity. The cable to be tested is attached between the indicator system and a dead man in the ground. However, since the crane hook swivels when stress is applied to the cable, the cable and indicator system spin around dangerously due to the twist of the wires and the lay in the cable manufacture. This causes damage to the cable being tested as well as danger to the valuable indicator system.

SUMMARY OF THE INVENTION

Accordingly, the present invention provides a cable testing system which eliminates the swivel on the crane hook. Means are provided for attaching a crane weight indicator system (dial scale) to a crane lifting block directly. Steel bars are inserted through the block on the lifting pin and four short slings are attached to these bars. The weight indicator is then hung by these slings, with the cable to be tested connected from the weight indicator to a dead man in the ground.

Therefore, an object of the present invention is to provide a cable testing system which enables convenient and safe testing of cables.

Another object of the present invention is to provide a cable testing system which eliminates unraveling of the cable under test.

Other objects, advantages and novel features of the present invention will be apparent from the following detailed description when read in conjunction with the appended claims and attached drawing.

BRIEF DESCRIPTION OF THE DRAWING

FIG. 2 is a plan view of the cable testing system according to the present invention.

FIG. 3 is a partial side view of the cable testing system taken along line 3—3 of FIG. 2.

DESCRIPTION OF THE PREFERRED EMBODIMENT

Figure 1:
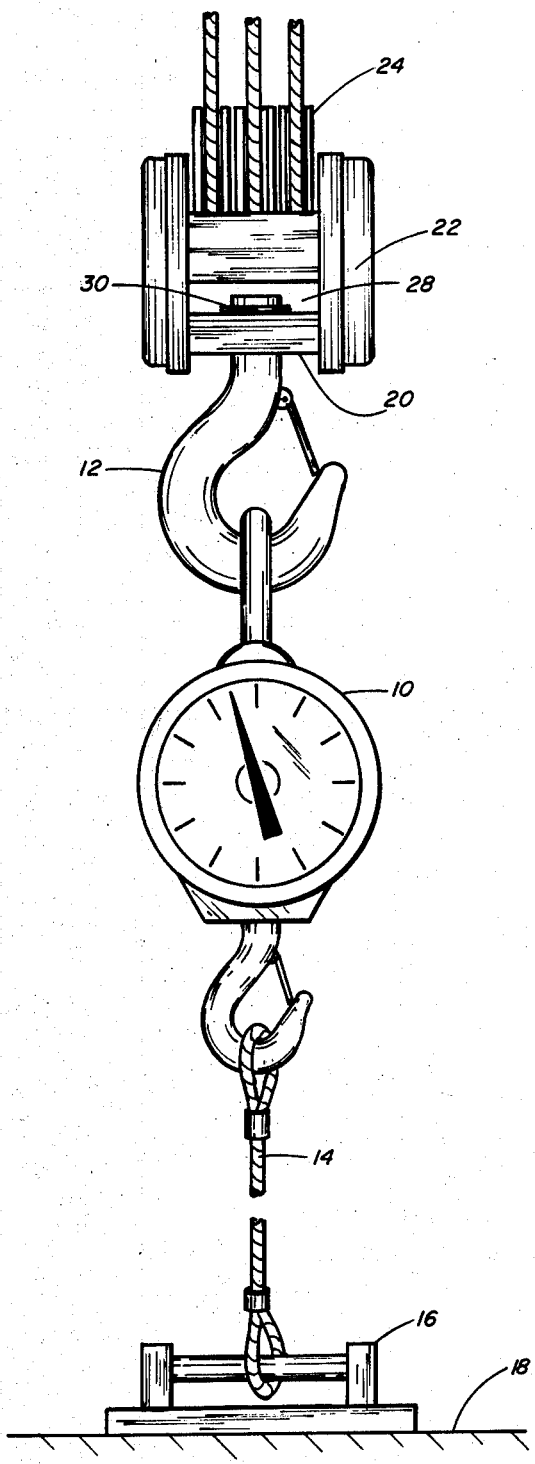
FIG. 1 is a plan view of the prior art cable testing system.

Referring now to FIG. 1 the prior art cable testing system is illustrated. A crane weight indicator system (dial scale) 10 is shown suspended from a crane hook 12. A test cable 14 is attached to the weight indicator 10 at one end and to a dead man 16 in the ground at the other end. The crane hook 12 is supported by a lifting pin 20 within which the crane hook swivels. A lifting block 22 supports the lifting pin 20 and a cable and pulley system 24 which is attached to a crane (not shown).

As shown in FIGS. 2 and 3 the present invention changes the means for attaching the weight indicator 10 to the crane. Bars 26 of a material such as steel are inserted in the space 28 between the lifting pin 20 and the cable and pulley system 24 on either side of the upper portion 30 of the crane hook 12. Slings 32 are hung from each end of the bars 26 by suitable means such as shackles 34 attached via holes in the ends of the bars. The other ends of the slings 32 are attached to the weight indicator 10. The test cable 14 is attached again between the weight indicator 10 and the dead man 16.

Thus, the present invention provides a cable testing system which eliminates spinning of the weight indicator when the test cable is stressed by supporting the weight indicator from four points of the lifting block rather than the crane hook.

What is claimed is:

1. A crane system for testing a cable comprising:
   a weight indicator system;
   means for suspending said weight indicator system directly from a crane lifting block, bypassing a crane hook, such that said weight indicator will not spin relative to said crane lifting block; and
   a dead man in the ground such that said cable is attached between said weight indicator system and said dead man when being tested.

2. An improved crane system for testing a cable of the type having a crane lifting block, a crane hook, a weight indicator system attached to the crane lifting block, and a dead man in the ground, the improvement comprising means for suspending said weight indicator system directly from said crane lifting block, bypassing said crane hook, so that when said cable is attached between said weight indicator system and said dead man and stressed, said weight indicator system will not spin relative to said crane lifting block.

3. A crane system for testing a cable as recited in claims 1 or 2 wherein said suspending means comprises:
   a pair of bars inserted within said crane lifting block and resting on the lifting pin of said crane lifting block; and
   a plurality of slings attached one to each end of each of said bars, the other end of said slings being attached to said weight indicator system.

* * * * *